(12) United States Patent
Huang et al.

(10) Patent No.: US 7,812,821 B2
(45) Date of Patent: Oct. 12, 2010

(54) OPTICAL MOUSE WITH LIGHT INDICATING FUNCTION

(75) Inventors: Wei-Lung Huang, Taoyuan County (TW); Yung-Shan Lin, Pingtung County (TW)

(73) Assignee: Lite-On Technology Corporation, Taipei (TW)

( * ) Notice: Subject to any disclaimer, the term of this patent is extended or adjusted under 35 U.S.C. 154(b) by 1193 days.

(21) Appl. No.: 11/417,990

(22) Filed: May 4, 2006

(65) Prior Publication Data
US 2006/0267945 A1  Nov. 30, 2006

(30) Foreign Application Priority Data
May 4, 2005 (TW) .............................. 94114462 A

(51) Int. Cl.
*G09G 5/08* (2006.01)
(52) U.S. Cl. ................... 345/166; 345/157; 345/158; 345/163; 345/179
(58) Field of Classification Search ............... 345/166, 345/157–158, 163, 179
See application file for complete search history.

(56) References Cited

U.S. PATENT DOCUMENTS

| 6,417,840 | B1 * | 7/2002 | Daniels ............. 345/158 |
| 7,161,578 | B1 * | 1/2007 | Schneider .......... 345/156 |
| 7,423,632 | B2 * | 9/2008 | Huang et al. ....... 345/163 |
| 2003/0028688 | A1 * | 2/2003 | Tiphane et al. ..... 710/1 |

* cited by examiner

*Primary Examiner*—Richard Hjerpe
*Assistant Examiner*—Leonid Shapiro
(74) *Attorney, Agent, or Firm*—Tim Tingkang Xia; Morris, Manning & Martin LLP

(57) ABSTRACT

An optical mouse with a light indicating function is provided, which includes a light source module, a reflecting mirror, and a button. The light source module is used for emitting an irradiating light. The reflecting mirror disposed on a path of the irradiating light and located at a normal position in use, for reflecting the irradiating light to generate a reflecting light for detecting the displacement of the optical mouse. The button is adopted for being pushed to move the reflecting mirror, so that the reflecting mirror is moved away from the normal position in use, and then the irradiating light travels straightly to serve as an indicating light beam of the light indicator.

12 Claims, 2 Drawing Sheets

OPTICAL MOUSE WITH LIGHT INDICATING FUNCTION

BACKGROUND OF THE INVENTION

1. Field of Invention

The present invention relates to an optical mouse. More particularly, the present invention relates to an optical mouse with a light indicating function.

2. Related Art

Due to the progress of science and technology, the performance of computers and computer peripherals are well developed and the prices are becoming much lower. Nowadays, computes are essential electronic equipments for companies and individuals or household entertainment, and are widespread in daily life.

Specifically, the notebook computer, which is portable and convenient, is popular, particularly among businessmen going on frequent business trips. Although compared with the desktop computer, the performance and the expandability of the notebook computer are relatively low, the notebook computer has the advantage of being portable, and the performance difference between the two has gradually been reduced along with the development of the manufacturing technology of electronic semiconductors. Now, the notebook computer is poised to overtake the conventional desktop computer in popularity.

Both the portable notebook computer and the desktop computer employ the operation that the user operates the computers by using input apparatuses, e.g. keyboards, mice, or touchpads, etc.

Businessmen, who give presentations frequently, usually connect a projector to the computer to project a picture on a wall after acquiring the picture from the computer, so as to produce a relatively large visual range for participants of a meeting, and also they can clearly view the entire data to deliver a speech.

During the presentation, the user usually makes use of a laser pointer to emphasize certain important words, or to attract the attention of participants of a meeting, so as to hold the meeting. However, during the presentation in the meeting, the user has to use a mouse to turn pages or skip pages among the presentation data, or use the mouse to switch to another application program to do supplementary explanation. Certainly, the user will not be embarrassed if he/she can freely use both hands. However, most users use one hand, so usually they have to put the laser pointer down and then operate the mouse, which causes an interruption of the meeting presentation. Moreover, since the laser pointer is very small, the situation of leaving it in a meeting room often occurs, so it is a problem how to store the laser pointer.

SUMMARY OF THE INVENTION

Accordingly, the present invention provides an optical mouse with a light indicating function. The objects of the present invention are to provide a mouse incorporated with the function of the laser pointer, and thus the user can make use of the function of the light indicator when using the optical mouse, and the electrical power of the light indicator is supplied by the optical mouse, thus eliminating the drawback of environmental pollution caused by using a mercury cell as in the conventional art.

According to the preferred detailed embodiment of the present invention, the optical mouse with a light indicating function includes a light source module, a reflecting mirror, and a button. The light source module is used for emitting an irradiating light. The reflecting mirror is disposed on a path of the irradiating light at a normal position in use for reflecting the irradiating light to an object, so as for detecting the displacement of the optical mouse. The button is disposed on the optical mouse. The user can press the button to move the reflecting mirror away from the normal position in use, thus the irradiating light reflected by the reflecting mirror travels straightly. That is, the optical mouse is not only provided with a common mouse function, but also is provided with a function of light indicator by using the irradiating light traveling straightly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
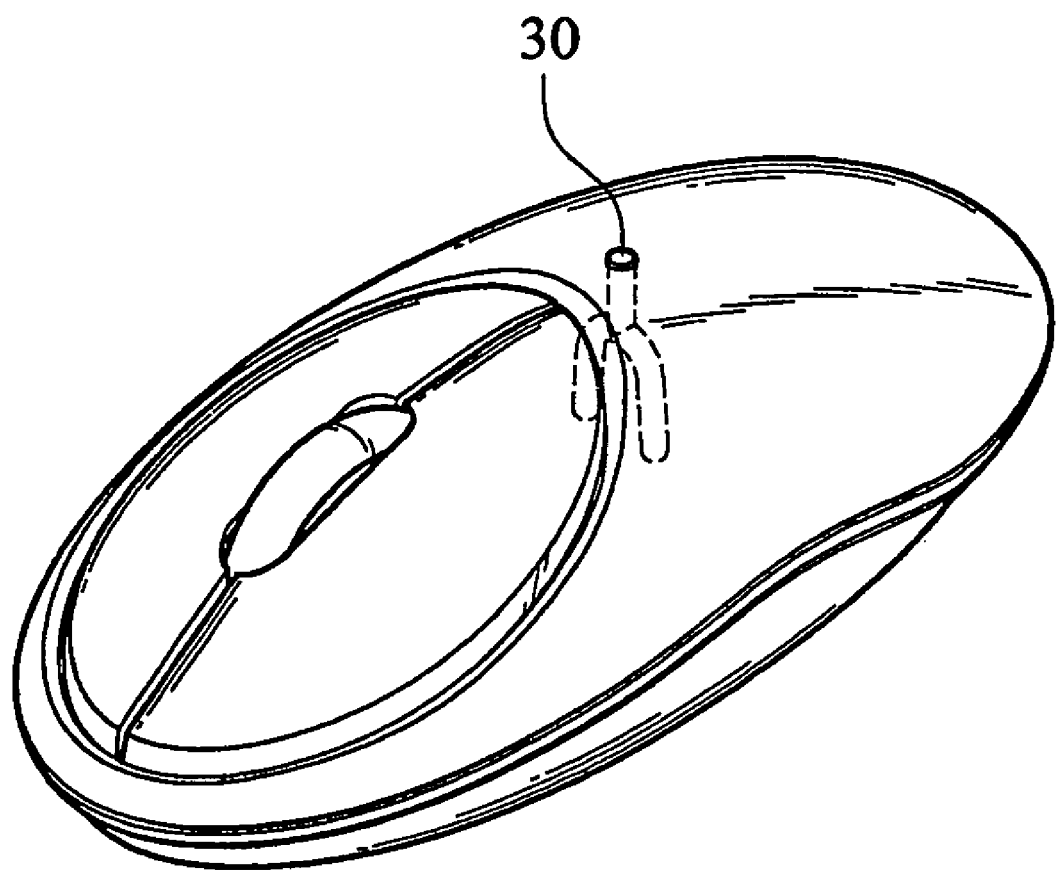
FIG. 1 is a perspective view of an optical mouse with a light indicating function an embodiment of the present invention.
Figure 2:
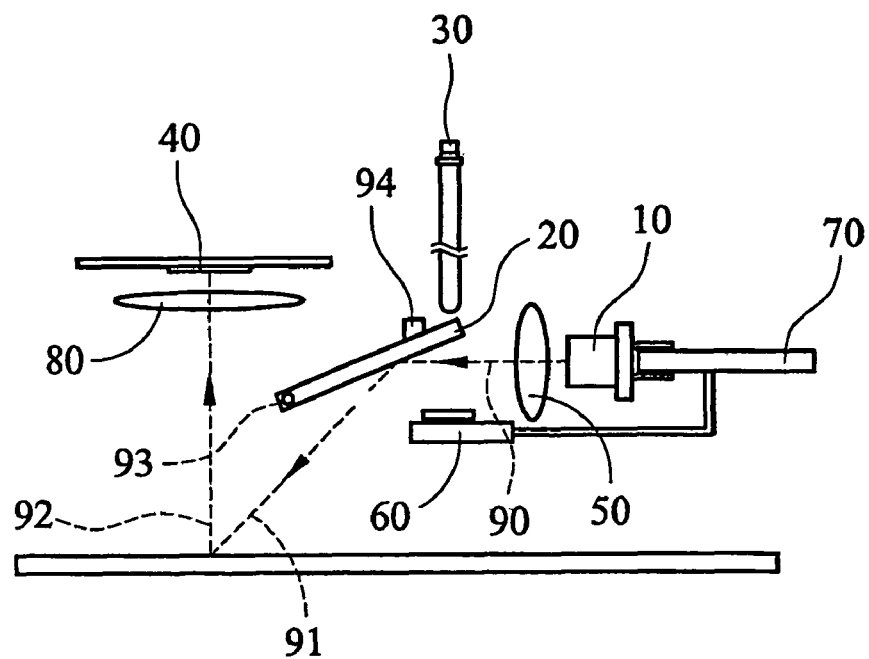
FIG. 2 is the schematic view of the optical mouse with a light indicating function in use of the embodiment of the present invention.
Figure 3:
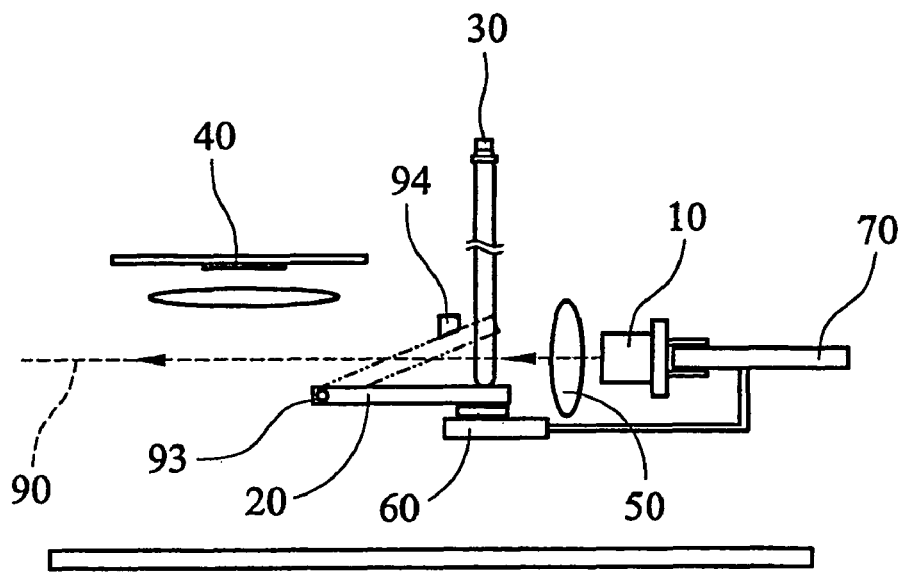
FIG. 3 is the schematic view of the optical mouse with a light indicating function in use of the embodiment of the present invention.

Referring to FIGS. 1, 2, and 3, an optical mouse of an embodiment of the invention is provided. The components not related to the present invention of the optical mouse are omitted, and only main operating elements of embodiment of the present invention are shown in the figures.

The mouse with a light indicating function according to the embodiment of the present invention includes a light source module 10, a reflecting mirror 20, and a button 30. The light source module 10 is disposed on a circuit board 70 in the optical mouse. Commonly, a laser diode is adopted as the light source module 10 for emitting an irradiating light. Further, a collimating mirror 50 is disposed between the light source module 10 and the reflecting mirror 20. The irradiating light travels along the irradiating light path 90, and penetrate the collimating mirror 50, so as to be projected onto the reflecting mirror 20. The reflecting mirror 20 is disposed on an irradiating light path 90 of the irradiating light, and is located at normal position in use as shown in FIG. 2 for reflecting the irradiating light. The reflected irradiating light travels along the reflecting light path 91 to be irradiated onto a surface of an object such as a desk, such that the surface of the object reflects the irradiating light to generate a reflecting light. The reflecting light travels along a reflecting light path 92, and penetrates the lens 80 and is received by the light signal receiver 40. That is, the reflecting light is generated by the irradiating light passing through the reflecting mirror 20 located at the position in use, and the light signal receiver 40 is used to receive the reflecting light for detecting the displacement of the optical mouse. After comparing the variance of the reflecting light, the displacement of the optical mouse is obtained.

As shown in FIG. 3, the user can selectively press the button 30 to move the reflecting mirror 20 to generate a displacement, to make the reflecting mirror 20 away from the normal position in use. After the reflecting mirror 20 is moved away from the normal position in use, the irradiating light is not reflected and instead the irradiating light travels straightly to generate an indicating light spot.

The user can make use of the indicating light spot progressing straightly to give a presentation.

Moreover, a gain switching 60 is further disposed in the path in which the button 30 pressed to be moved. The gain switching 60 is disposed on the circuit board and electrically connected to light source module 10. When the user pushes the button 30 to move the reflecting mirror 20, the gain switching 60 is activated by the button 30 simultaneously for enhancing, the intensity of the irradiating light of the light source module 10. Next, a resetting element, preferably e.g. a torsional spring 93, is connected to the reflecting mirror 20 for moving the reflecting mirror 20. A stopper 94 is disposed at an appropriate position inside the optical mouse. In this manner, when the button 30 is not pushed by the user, the reflecting mirror 20 can be moved to the normal position in use.

According to the embodiment of the present invention, the function of laser pointer is perfectly integrated in the optical mouse. In the conventional art, a laser pointer is additionally required to give a presentation, and a mercury cell is required to operate it, which may cause drawbacks such as environmental pollution. The above problems are eliminated in the embodiment of the present invention. After the implementation of the preferred detailed embodiment of the present invention, the light source module and the electrical energy of the optical mouse are shared, so the user can simultaneously operate the computer equipment and give a presentation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical mouse with light indicating function, comprising:
   a light source module for emitting an irradiating light;
   a reflecting mirror disposed on a path of the irradiating light at a normal position in use, for reflecting the irradiating light for detecting the displacement of the optical mouse; and
   a button for being pushed to move the reflecting mirror, wherein the reflecting mirror is moved away from the normal position in use, and then the irradiating light travels straightly to generate a indicating light spot.

2. The optical mouse as claimed in claim 1, further comprising a gain switching connected to the light source module, activated by the button, for enhancing the intensity of the irradiating light.

3. The optical mouse as claimed in claim 1, further comprising a collimating mirror disposed between the light source module and the reflecting mirror.

4. The optical mouse as claimed in claim 1, wherein the light source module is a laser diode.

5. The optical mouse as claimed in claim 1, wherein a resetting element is connected to the reflecting mirror for moving the reflecting mirror to the normal position in use when the button is not pushed.

6. The optical mouse as claimed in claim 5, wherein the resetting element is a torsional spring.

7. An optical mouse with light indicating function, comprising:
   a light source module for emitting an irradiating light;
   a reflecting mirror disposed on a path of the irradiating light at a normal position in use, for reflecting the irradiating light for detecting the displacement of the optical mouse;
   a light signal receiver for receiving the irradiating light; and
   a button, when not being pushed, the irradiating light being projected to a surface of an object and then reflected to the light signal receiver, while when being pressed to move the reflecting mirror being moved to generate a displacement, such that the irradiating light travels straightly to generate an indicating light spot.

8. The optical mouse as claimed in claim 7, further comprising a gain switching connected to the light source module, activated by the button, for enhancing the intensity of the irradiating light.

9. The optical mouse as claimed in claim 7, further comprising a collimating mirror disposed between the light source module and the reflecting mirror.

10. The optical mouse as claimed in claim 7, wherein the light source module is a laser diode.

11. The optical mouse as claimed in claim 7, wherein a resetting element is connected to the reflecting mirror for moving the reflecting mirror to the normal position in use when the button is not pushed.

12. The optical mouse as claimed in claim 11, wherein the resetting element is a torsional spring.

* * * * *